(12) United States Patent
Nishida

(10) Patent No.: US 7,654,510 B2
(45) Date of Patent: Feb. 2, 2010

(54) ANTI-SLIP DEVICE

(75) Inventor: Kazumasa Nishida, Utsunomiya (JP)

(73) Assignee: Mitsubishi Cable Industries, Ltd., Itami-shi (JP)

( * ) Notice: Subject to any disclaimer, the term of this patent is extended or adjusted under 35 U.S.C. 154(b) by 403 days.

(21) Appl. No.: 11/174,490

(22) Filed: Jul. 6, 2005

(65) Prior Publication Data
US 2006/0023140 A1 Feb. 2, 2006

(30) Foreign Application Priority Data
Jul. 28, 2004 (JP) ............... 2004-220388

(51) Int. Cl.
*B23Q 3/00* (2006.01)
(52) U.S. Cl. ................................. 269/289 R
(58) Field of Classification Search ............ 269/289 R, 269/21, 286, 281, 275
See application file for complete search history.

(56) References Cited

U.S. PATENT DOCUMENTS 4,438,936 A * 3/1984 Schlegel ................. 277/567
5,820,116 A * 10/1998 Haese ..................... 269/21
6,824,000 B2 * 11/2004 Samelson ................ 211/105.3

FOREIGN PATENT DOCUMENTS

JP         8-86993        4/1996

* cited by examiner

Primary Examiner—Lee D Wilson
(74) Attorney, Agent, or Firm—Kratz, Quintos & Hanson, LLP

(57) ABSTRACT

An anti-slip device provided with a supporting plate of metal or resin having an attachment portion on a reverse face for other members, and a rubber elastic body unitedly mounted on the supporting plate. Plural connection holes are formed from an obverse face to the reverse face of the supporting plate. Further, the rubber elastic body is composed of a receiving piece portion covering approximately whole of the obverse face and a falling-prevention portion from the reverse face to connect the receiving piece portion through a peripheral portion and the connection hole.

5 Claims, 6 Drawing Sheets

ANTI-SLIP DEVICE

BACKGROUND OF THE INVENTION

1. Field of the Invention

This invention relates to an anti-slip device for carrier tray for semiconductors, liquid crystal panels, and large glass plates used in carrying device for liquid crystal panels and large glass plates of plasma TV.

2. Description of the Related Art

In a production line of liquid crystal panels, the liquid crystal panels are placed on carrier trays or fixed to frames like architraves to be moved on a conveyer. When the carrier tray in a carrying state stops, the liquid crystal panel slips on the tray and deviates from a right position, and deformation is generated on a central portion by sagging for self weight of the panel when the panel is large-sized. These are supposed not to occur in the production process of the liquid crystal panels in which surface treatment is conducted with high dimensional accuracy.

To solve the problem above, conventionally, a jig is made by serially layering glue and an adhesive layer on a supporting body composed of a resin plate, and a base of a liquid crystal indicator element (liquid crystal panel) is detachably attached to the adhesive layer to be carried (refer to Japanese Patent Provisional Publication No. 8-86993).

However, the production process of the conventional jig for carrying is complicated and laborsome because the supporting body, the glue, and the adhesive layer must be layered as not to contain air bubbles. Further, when the jig for carrying is used for etching treatment process of semiconductors and exposed to corrosive gas in plasmic state, the adhesive layer deteriorates and drops off, and foreign matter sticks to (mixed with) the product.

And, to reduce the labor in the production process of the conventional jig for carrying, an anti-slip device (screw with seat), in which a circular dovetail groove 39 is formed on an obverse face 3 of a supporting plate 1 of resin or metal having an attachment portion 6 on a reverse face 4 and a rubber elastic body 2 is unitedly attached to the obverse face 3 as shown in FIG. 13, is attached to a corner portion of the carrier tray on which the liquid crystal panel is placed.

However, the connection of the supporting plate 1 to the rubber elastic body 2 is not firm, the rubber elastic body 2 may be peeled off when the placed liquid crystal panel is removed.

It is therefore an object of the present invention to provide an anti-slip device (screw with seat) for carrier tray with which the rubber elastic body is not peeled off by outer force working when the placed liquid crystal panel is attached and detached, and hardly deteriorated when used in etching treatment process.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
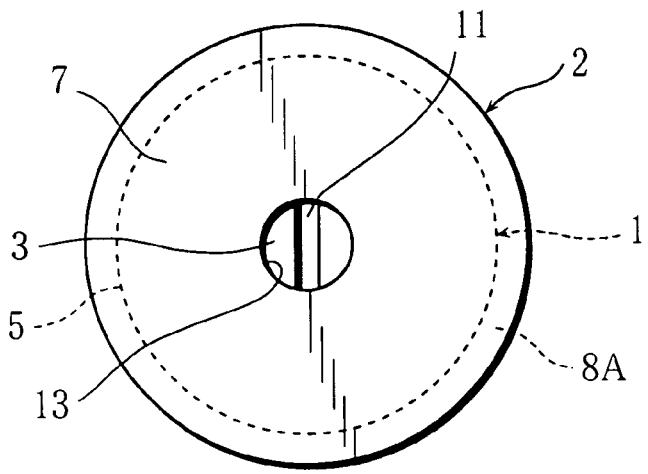
FIG. 1 is a top view showing a first embodiment of the present invention.
Figure 2:
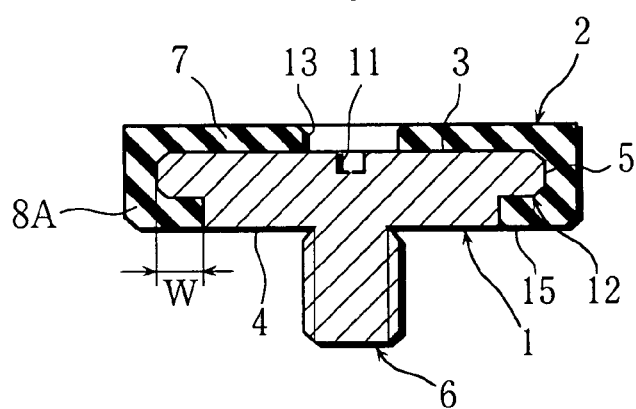
FIG. 2 is a cross-sectional side view.
Figure 3:
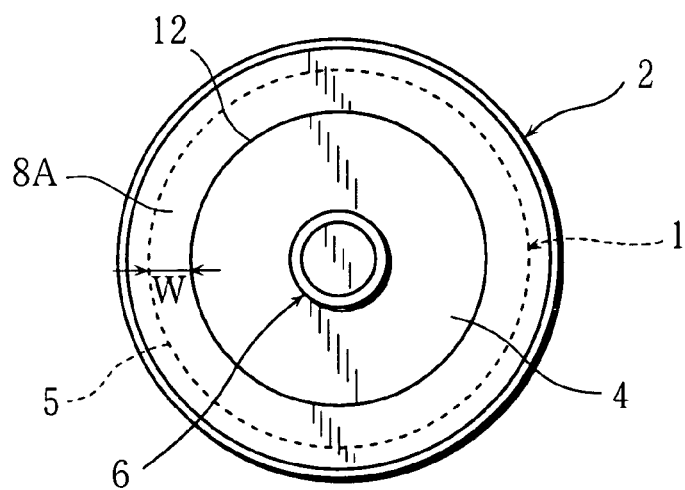
FIG. 3 is a bottom view.

In a first embodiment shown in FIGS. 1, 2, and 3, a mark 1 represents a supporting plate made of metal or resin, flat and circular in top view. A rubber elastic body 2 is unitedly attached to the supporting plate 1. An attachment portion 6, which can be attached to and detached from another member (such as a carrier tray), is protruding from a center of a reverse face 4 of the supporting plate 1 as to be at right angles with the reverse face 4, and the supporting plate 1 and the attachment portion 6 are unitedly formed. In this case, the attachment portion 6 is formed as a male screw. And, a concave portion 11 for fastening is formed on a center of an obverse face 3 of the supporting plate 1. The concave portion 11 for fastening, formed to be a straight groove as to fit to a minus driver, may be cross, hexagonal, or other configurations. Further, a notched portion 12 of ring, notched with a predetermined width dimension W in a peripheral portion 5, is formed on the reverse face 4 of the supporting plate 1, namely, the supporting plate 1 is formed into a large disc to which a small disc is coaxially and unitedly attached on the reverse face side.

The rubber elastic body 2 is composed of a receiving piece portion 7 covering approximately whole, defined in the present invention as equal to or more than 90%, of the obverse face 3 of the supporting plate 1, and a falling-prevention portion 8A to unitedly connect the receiving piece portion 7 to the supporting plate 1 as to embrace the notched portion 12 and the peripheral portion 5. The receiving piece portion 7 is a sheet having uniform thickness and circular in top view, of which outer peripheral edge portion is disposed as to form a coaxial circle larger than the peripheral portion 5 of the supporting plate 1 (refer to FIG. 1). Further, a circular through hole portion 13 is formed on a position corresponding to the concave portion 11 for fastening of the receiving piece portion 7. The falling-prevention portion 8A is a circular ring having a uniform width in bottom view, of which lower face 15 is disposed on the same plane with the lowest face of the reverse face 4 of the supporting plate 1. And, the outer peripheral edge portion of the falling-prevention portion 8A and the outer peripheral edge portion of the receiving piece portion 7 are disposed on the same circle.

The rubber elastic body 2, although can be composed of perfluoro elastomer, fluororubber, silicone rubber, ethylene-propylene-diene rubber (EPDM), or nitrile rubber (NBR), is preferably made of perfluoro elastomer having durability against heat and plasma etching when used under the circumstances of etching process.

The supporting plate 1 is preferably made of stainless steel such as SUS304 for anti-corrosiveness and workability when used under the circumstances of etching process. And, when the supporting plate 1 is made of resin, although various known resins can be applied, polyphenilene sulfide (PPS), polyethyl etherketone (PEEK), polyimide (PI), and perfluoro alcoxylalkane (PFA) are preferable for durability to heat.

As methods to unitedly attach the rubber elastic body 2 to the supporting plate 1, following methods are applicable. In one method, the supporting plate 1 is set into a mold, melted rubber is injected, then, the melted rubber is hardened by vulcanization process to be unified with the supporting plate 1. In another method, the supporting plate 1 is set into a mold for compression molding, raw rubber is attached to the supporting plate 1 by compression molding, then the rubber is hardened by vulcanization process to be unified with the supporting plate 1. In still another method, the vulcanization-molded rubber elastic body 2 is united with the supporting plate 1 with adhesive.

Figure 4:
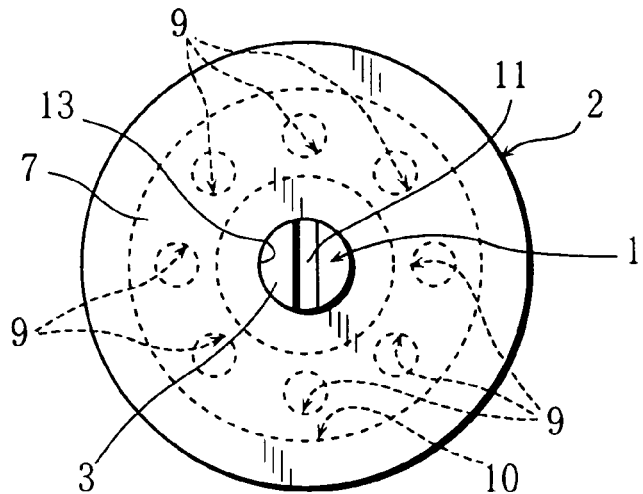
FIG. 4 is a top view showing a second embodiment of the present invention.
Figure 5:
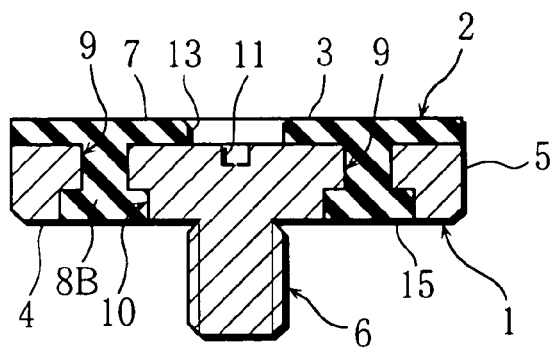
FIG. 5 is a cross-sectional side view.
Figure 6:
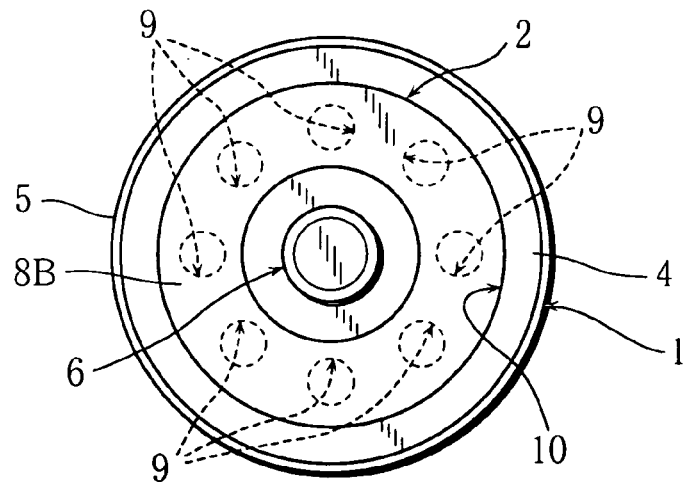
FIG. 6 is a bottom view.

Next, in a second embodiment shown in FIGS. 4, 5, and 6, the supporting plate 1 and the rubber elastic body 2, unitedly mounted on the supporting plate 1, are provided, a shallow circular concave groove 10 is formed on the reverse face 4 side of the supporting plate 1, and plural connection holes 9, of which lateral cross section is circular, are formed as to go through the obverse face 3 and a bottom wall of the circular concave groove 10.

The circular concave groove 10 is a square groove as to hold the rubber elastic body 2 onto the supporting plate 1, the plural connection holes 9 are disposed with a predetermined pitch along the peripheral direction, and a diameter dimension of the cross section of the connection hole 9 is set to be smaller than the width dimension of the circular concave groove 10.

And, inner and outer side walls of the circular concave groove 10 are disposed on the coaxial circle with the peripheral portion 5 of the supporting plate 1 in bottom view (refer to FIG. 6).

The rubber elastic body 2 is composed of a receiving piece portion 7 covering approximately whole of the obverse face 3 and a falling-prevention portion 8B filling the circular concave groove 10 and the connection holes 9 and unitedly connected to the receiving piece portion 7. The outer peripheral edge portion is disposed on the same periphery with the peripheral portion 5 of the supporting plate 1. And, a lower face 15 of the falling-prevention portion 8B is disposed on the same plane with the lowest face of the reverse face 4 of the supporting plate 1.

Figure 9:
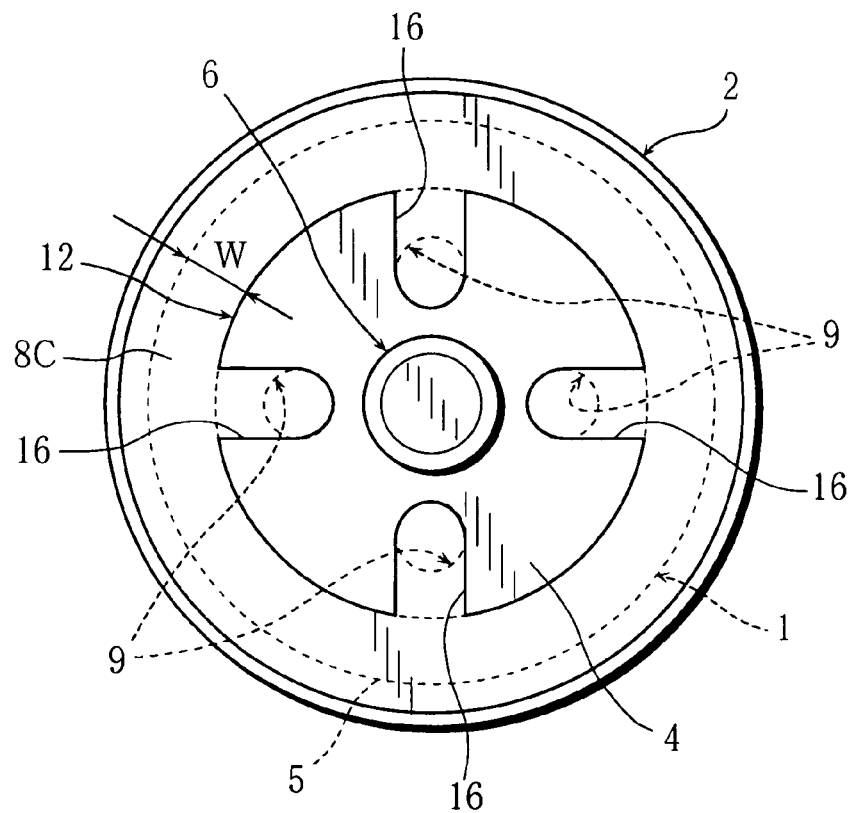
FIG. 9 is a bottom view.
Figure 10:
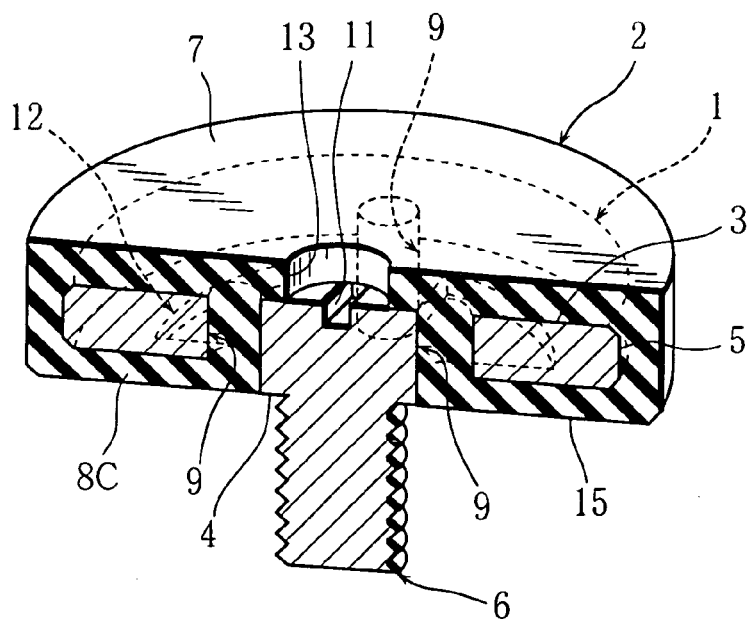
FIG. 10 is a cross-sectional perspective view.

In FIGS. 4 through 6, explanation of the members of the same marks as in FIGS. 1 through 3 is omitted because they are similarly constructed to that of FIGS. 1 through 3, And, in a third embodiment shown in FIGS. 7 through 10, the supporting plate 1 and the rubber elastic body 2, unitedly mounted on the supporting plate 1, are provided, a notched portion 12 of ring, notched with a predetermined width dimension W in a peripheral portion 5, is formed on the reverse face 4 of the supporting plate 1. Further, plural connection holes 9, having circular lateral cross section, are formed from the obverse face 3 to the reverse face 4 of the supporting plate 1, and opening portions of the connection holes 9 on the reverse face 4 side are disposed near the center of the supporting plate 1 within the notched portion 12. As shown in FIG. 9, in a bottom view, the plural connection holes 9 are disposed on a circle coaxial with the center of the supporting plate 1 with a predetermined pitch. And, connecting concave grooves 16 are formed on the reverse face 4 of the supporting plate 1 to connect the connection holes 9 and the notched portion 12, and the connecting concave grooves 16 are disposed in diameter direction of the supporting plate 1.

The rubber elastic body 2 is composed of a receiving piece portion 7 covering approximately whole of the obverse face 3 and a falling-prevention portion 8C unitedly connected to the receiving piece portion 7. The falling-prevention portion 8C from the notched portion 12 is connected to the receiving piece portion 7 through the peripheral portion 5, and filling the connecting concave grooves 16 and the connection holes 9 and connected to the receiving piece portion 7. As described above, the third embodiment is preferable to prevent the rubber elastic body 2 from being peeled off the supporting plate 1 because the receiving piece portion 7 and the falling-prevention portion 8C are more firmly connected in the third embodiment of the present invention than that of the first and second embodiments.

Figure 7:
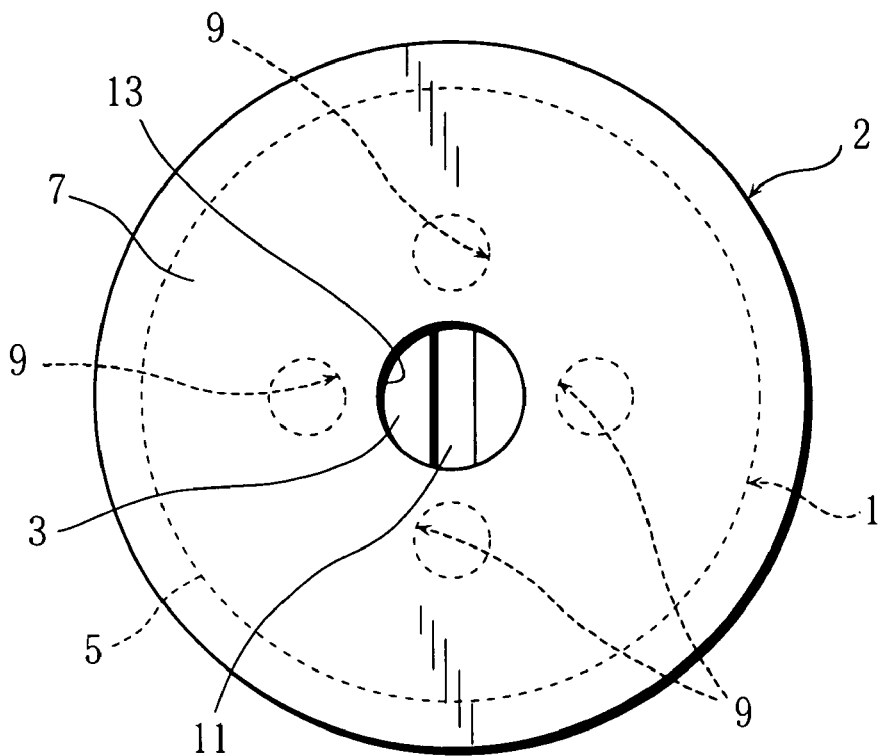
FIG. 7 is a top view showing a third embodiment of the present invention.
Figure 8:
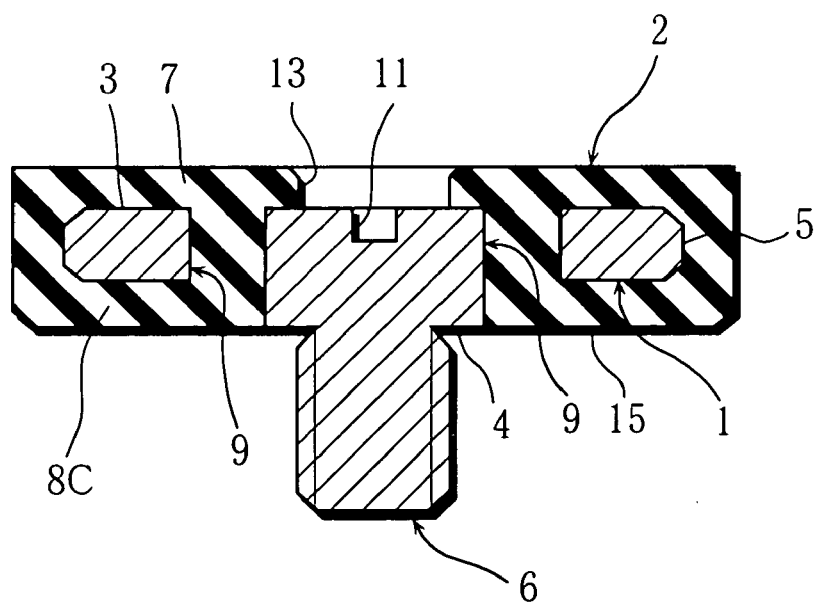
FIG. 8 is a cross-sectional side view.

The outer peripheral edge portion of the receiving piece portion 7 is disposed as to form a coaxial circle larger than the peripheral portion 5 of the supporting plate 1 (refer to FIG. 7). The outer peripheral edge portion of the falling-prevention portion 8C and the outer peripheral edge portion of the receiving piece portion 7 are disposed on the same periphery. And, the lower face 15 of the falling-prevention portion 8C is disposed on the same face with the lowest face of the reverse face 4 of the supporting plate 1.

In the anti-slip device shown in FIGS. 7 through 10, freely changeable in design, the width dimension W of the notched portion 12 may be larger to make the connection hole 9 go from the obverse face 3 into the notched portion 12. That is to say, the connecting concave grooves 16 may not be formed.

In FIGS. 7 through 10, explanation of the members of the same marks as in FIGS. 1 through 3 is omitted because they are similarly constructed to that of FIGS. 1 through 3.

Figure 12A:
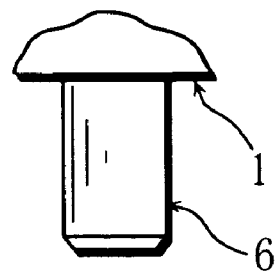
FIG. 12A is an explanatory view showing another embodiment of an attachment portion.
Figure 12B:
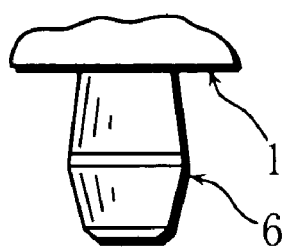
FIG. 12B is an explanatory view showing still another embodiment of the attachment portion.
Figure 12C:
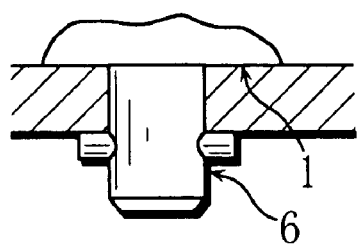
FIG. 12C is an explanatory view showing further embodiment of the attachment portion.
Figure 12D:
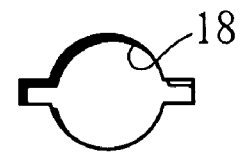
FIG. 12D is an explanatory view showing another embodiment of the attachment portion.
Figure 13:
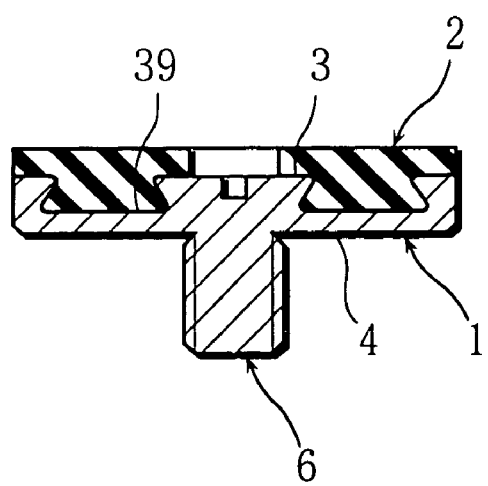
FIG. 13 is a cross-sectional side view showing a conventional anti-slip device.

The attachment portion 6, can be freely changed in design, may be formed as a round stick (inserted to a round hole on another member) as shown in FIG. 12A. And, as shown in FIG. 12B, a part of the periphery of the attachment portion 6 may be made large to be elastically press-fit to an inner face of a round hole on another member. And, the attachment portion 6 may be made key-shaped having protrusions around a stick as shown in FIG. 12C, and inserted to a key hole portion 18 as shown in FIG. 12D, then rotated to be fixed. And, the attachment portion 6 may be a cylindrical member on which a female screw portion is formed on an inner peripheral face, and screwed into a male screw portion formed on another member (not shown in Figures).

Although the attachment portion 6 shown in FIGS. 12B, 12C, and 1 through 10 is more firmly fixed to the other member against vibration in vertical direction (in an axis direction) than the attachment portion 6 shown in FIG. 12A, the attachment portion 6 shown in FIG. 12A is not deviated from the other member by vibration because the liquid crystal panel is moved mainly in back-and-forth direction.

An operation method (function) of the above-described anti-slip device (screw with seat) of the present invention is described.

Figure 11:
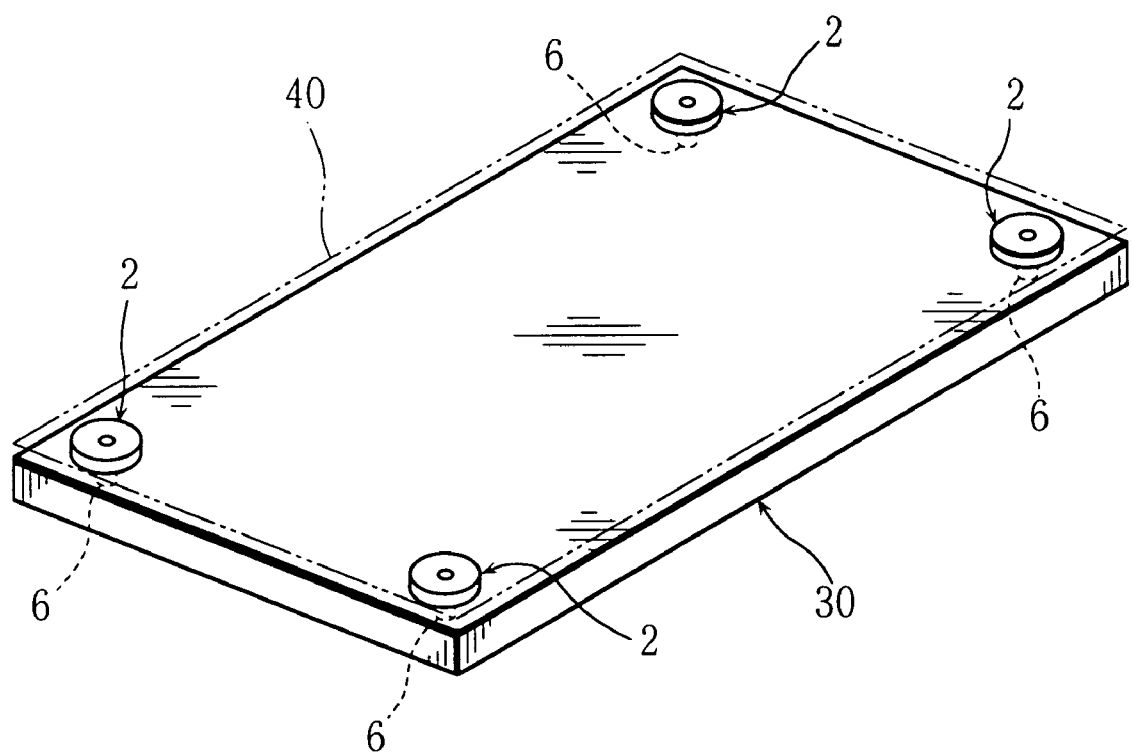
FIG. 11 is a perspective view showing a used state.

In FIG. 11, a mark 30 represents a flat and rectangle carrier tray moving on a conveyer, and a female screw hole is formed on each of four corners (corner portions) of the carrier tray 30 (not shown in Figures). the attachment portion 6 of the anti-slip device of the present invention is rotated and screwed into the female screw hole, screwed further by a driver of which forth end is fit to the concave portion 11 for fastening on the obverse face 3 to be fastened to the carrier tray 30. Then, a placed object 40 such as a liquid crystal panel and a glass plate is placed on the receiving piece portion 7 of the rubber elastic body 2 to be carried.

After the treatment process of the placed object 40 placed on the carrier tray 30, the placed object 40 is removed from the receiving piece portion 7 of the rubber elastic body 2, and another pre-treatment placed object 40 is placed and carried.

The anti-slip device of the present invention can be attached to other portions than the 4 corners (corner portions) of the carrier tray 30 when female screw holes are formed, and number and place of attachment are Preferably changed corresponding to the kind and carrying speed of the placed object 40.

As described above, the receiving piece portion 7 and the falling-prevention portion 8A are firmly connected and the receiving piece portion 7 of the rubber elastic body 2 is not peeled off the supporting plate 1 by external force working when the placed object 40 is placed and removed because the anti-slip device of the present invention is provided with the supporting plate 1 of metal or resin on which the attachment portion 6 to another member is protruding from the reverse face 4, and the rubber elastic body 2 mounted unitedly to the supporting plate 1, further, the rubber elastic body 2 is composed of the receiving piece portion 7 covering approximately whole of the obverse face 3 of the supporting plate 1, and the falling-prevention portion 8A to connect the reverse face 4 to the receiving piece portion 7 as to embrace the peripheral portion 5.

And, the anti-slip device of the present invention can be attached to the existing carrier tray 30, and easily attached to and detached from the tray 30 corresponding to the kind and carrying speed of the placed object 40.

And, the receiving piece portion 7 and the falling-prevention portion 8B are firmly connected and the receiving piece portion 7 of the rubber elastic body 2 is not peeled off the supporting plate 1 by external force working when the placed object 40 is placed and removed because the anti-slip device of the present invention is provided with the supporting plate 1 of metal or resin on which the attachment portion 6 to another member is protruding from the reverse face 4 and the rubber elastic body 2 mounted unitedly to the supporting plate 1, further, the shallow circular concave groove 10 is formed on the reverse face 4 side of the supporting plate 1, the plural connection holes 9 are formed from the obverse face 3 of the supporting plate 1 to the circular concave groove 10, and, the rubber elastic body 2 is composed of the receiving piece portion 7 covering approximately whole of the obverse face 3 of the supporting plate 1 and the falling-prevention portion 8B filled into the circular concave groove 10 and the connection hole 9 and connected to the receiving piece portion 7.

And, the receiving piece portion 7 and the falling-prevention portion 8C are firmly connected and the receiving piece portion 7 of the rubber elastic body 2 is not peeled off the supporting plate 1 by external force working when the placed object 40 is placed and removed because the anti-slip device of the present invention is provided with the supporting plate 1 of metal or resin on which the attachment portion 6 to another member is protruding from the reverse face 4 and the rubber elastic body 2 mounted unitedly on the supporting plate 1, the plural connection holes 9 are formed from the obverse face 3 to the reverse face 4 of the supporting plate 1, and the rubber elastic body 2 is composed of the receiving piece portion 7 covering approximately whole of the obverse face 3 and the falling-prevention portion 8C to connect the reverse face 4 to the receiving piece portion 7 through the peripheral portion 5 and the connection holes 9.

And, the placed object 40 does not slip and deviate from the carrier tray 30, the placed object 40 is fixed to a predetermined position and carried stably, and various treatments of the placed object 40 can be conducted with high dimensional accuracy because the anti-slip device is used for the carrying device for liquid crystal panels and large glass plates of plasma TV. And, even large crystal panels and large glass plates can be stably carried without deviation, and various treatments can be conducted with high dimensional accuracy.

The rubber elastic body 2, composed of at least one material chosen from fluororubber, silicone rubber, ethylene-propylene-diene rubber, and nitrile rubber, hardly deteriorates when used in various treatment processes.

And, the rubber elastic body 2, composed of perfluoro elastomer, hardly deteriorates when used in etching processes. Especially, the rubber elastic body 2 hardly deteriorates when used under the corrosive gas atmosphere such as plasmic gas. For this, dust (foreign matter), generated by deterioration (corrosion) of the rubber elastic body 2 in etching process, does not stick to (being mixed with) the product, and products of high quality can be provided. And, all processes can be conducted with carrying by one carrier tray 30 even if etching processes exist in the production line.

While preferred embodiments of the present invention have been described in this specification, it is to be understood that the invention is illustrative and not restrictive, because various changes are possible within the spirit and indispensable features.

What is claimed is:

1. An anti-slip device provided with a supporting plate of metal or resin, having an outer periphery, on which an attachment portion to another member is threaded and protruding from a reverse face, the reverse face having a notched portion at the outer periphery of the supporting plate, and a rubber elastic body mounted unitedly to the supporting plate comprising a construction in which the rubber elastic body is composed of a receiving piece portion covering approximately whole of an obverse face of the supporting plate and a falling-prevention portion to connect the reverse face to the receiving piece portion as to embrace a peripheral portion, the falling-prevention portion connected to the receiving piece portion and the periphery of the supporting plate, with a lower face of the falling-prevention portion disposed on the same plane as the lowest face of the reverse face of the supporting plate, and a concave portion for fastening is formed on the obverse face of the supporting plate to screw the threaded attachment portion into the other member.

2. An anti-slip device provided with a supporting plate of metal or resin on which an attachment portion to another member is protruding from a reverse face, and a rubber elastic body mounted unitedly to the supporting plate comprising a construction in which:
   plural connection holes are formed from an obverse face to the reverse face of the supporting plate; and
   the rubber elastic body is composed of a receiving piece portion covering approximately whole of the obverse face, and a falling-prevention portion to connect the reverse face to the receiving piece portion through a peripheral portion and the connection holes with a lower face of the falling-prevention portion disposed on the same plane as a lowest face of the reverse face of the supporting plate.

3. The anti-slip device as set forth in claim 1 or 2, which is used for carrying device for liquid crystal panels and large glass plates of plasma TV.

4. The anti-slip device as set forth in claim 1 or 2, wherein the rubber elastic body is composed of at least one material chosen from fluororubber, silicone rubber, ethylene-propylene-diene rubber, and nitrile rubber.

5. The anti-slip device as set forth in claim 1 or 2, wherein the rubber elastic body is composed of perfluoro elastomer.

* * * * *